Jan. 26, 1954  A. BLAAUW ET AL  2,667,329
TRACTOR JACK
Filed Dec. 22, 1952  2 Sheets-Sheet 1
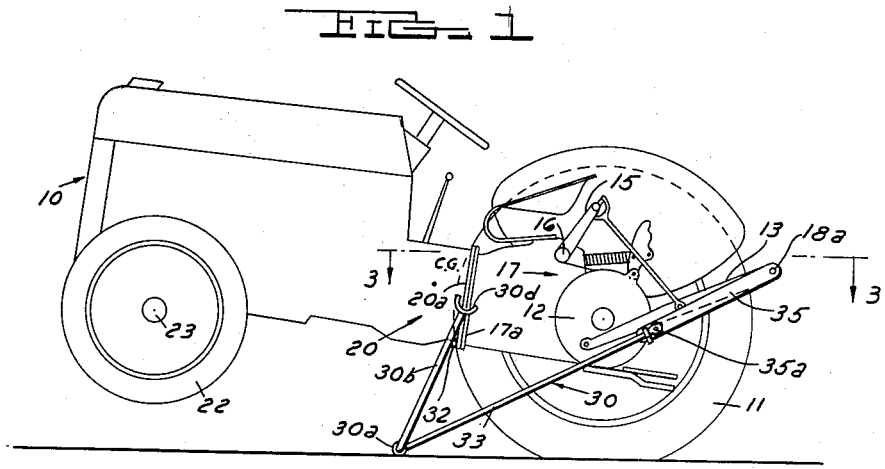
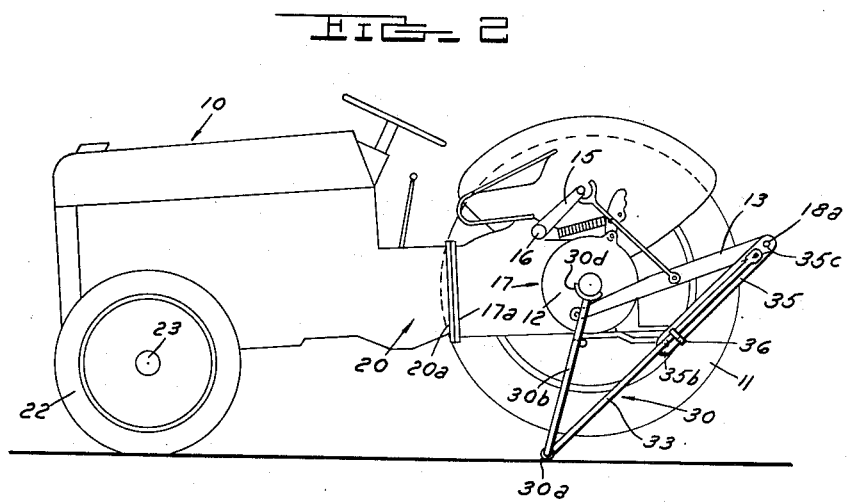
INVENTORS
ANDREW BLAAUW
GEORGE W. FINDLEY
BY
ATTORNEYS

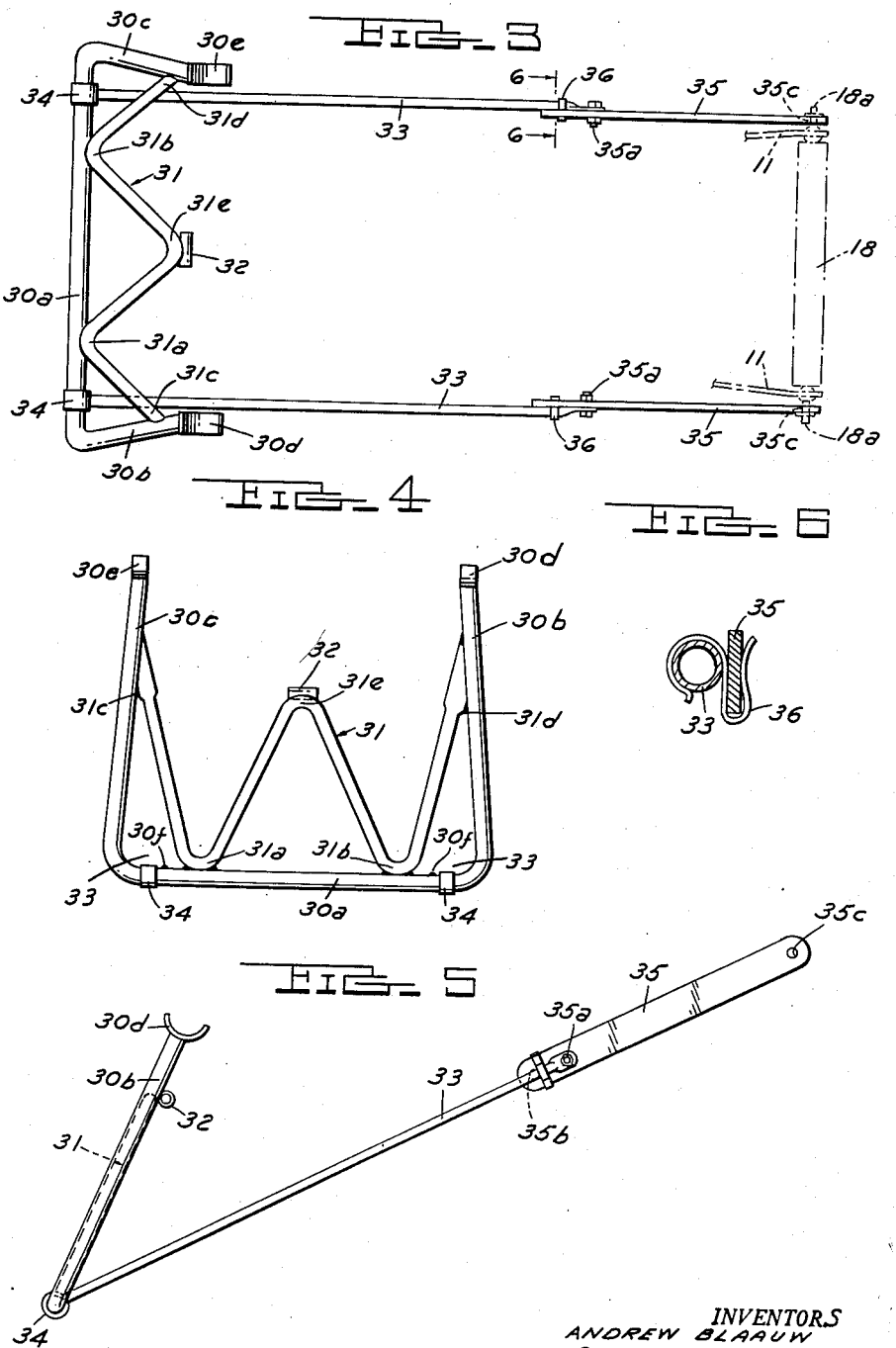

Patented Jan. 26, 1954

2,667,329

UNITED STATES PATENT OFFICE 2,667,329

TRACTOR JACK

Andrew Blaauw and George W. Findley, Birmingham, Mich., assignors to Dearborn Motors Corporation, Birmingham, Mich., a corporation of Delaware Application December 22, 1952, Serial No. 327,330

1 Claim. (Cl. 254—124)

This invention relates to a tractor jack and more particularly to an improved frame construction for a jack suitable for use with a tractor having laterally spaced, power-lifted, trailing hitch links.

In the co-pending application of George W. Findley, Serial No. 268,997, filed January 30, 1952, and assigned to the assignee of this application, there is disclosed a tractor jack for use with a tractor having trailing, power-lifted, hitch links which is effective to selectively elevate either the front or rear wheels of the tractor according to whether the jack stand is engaged with the tractor body adjacent the rear axle or at a point displaced substantially forwardly from the rear axle.

It is an object of this invention to provide an improved frame construction for a jack of the type described in the above mentioned co-pending application characterized by the obtainment of an unusual degree of rigidity at a most economical manufacturing cost.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of a tractor with a jack embodying this invention assembled thereto in the position producing elevation of the tractor front wheels;

Figure 2 is a view similar to Figure 1 except that the jack is engaged with the tractor in such manner as to produce elevation of the tractor rear wheels;

Figure 3 is a plan view of the improved jack construction embodying this invention;

Figure 4 is a side elevational view of the jack;

Figure 5 is a front elevational view of the jack; and

Figure 6 is an enlarged scale, sectional view taken on the plane 6—6 of Figure 3.

As shown on the drawings:

In Figures 1 and 2, there is shown a tractor 10 of well-known make. Tractor 10 has a pair of rear wheels 11, one of which, however, is removed for clarity of illustration and such wheels are respectively rotatably mounted on the ends of a rear axle housing 12. A pair of hitch links 13 are connected at laterally spaced points to the tractor axle housing 12. A drawbar 18 having pinlike ends 18a is connected between the ends of hitch links 13. A pair of rock arms 15 are respectively secured to the ends of a transverse rock shaft 16 journaled in the upper portion of the differential housing 17 of tractor 10. Rock shaft 16 is rotated by a built-in hydraulic mechanism (not shown). The differential housing terminates in a forwardly facing end flange 17a which is connected to a rearwardly facing flange 20a of the tractor transmission housing 20 by a plurality of bolts 21. The center of gravity CG of the tractor is generally located slightly forwardly of the joined flanges 17a and 20a and is disposed approximately on the horizontal center line of the tractor rear axle housing 12. The front end of tractor 10 is supported by a pair of wheels 22 journaled on the ends of a front axle 23. All of the above described elements of the tractor 10 are well-known and hence further description thereof is not believed necessary.

The improved tractor jack 30 constructed in accordance with this invention embodies an integrally formed U-shaped main frame member having a horizontal ground-engaging base portion 30a and upwardly extending arm portions 30b and 30c which are slightly inclined toward each other, as best indicated in Figure 4. On the top ends of arm portions 30b and 30c arcuate straps 30d and 30e are welded thereto, such straps being shaped to conform to laterally spaced points on the tractor rear axle housing 12. The over-all height of arm portions 30b and 30c are proportioned so as to be greater than the vertical elevation of the tractor rear axle housing 12 above the ground.

A brace element 31 is provided which is of W-shaped configuration. The two bottom vertex portions 31a and 31b of brace 31 are rigidly secured to bight portion 30a of the main frame, as by welding, and the free end portions 31c and 31d of brace 31 are respectively welded to medial portions of arms 30b and 30c. The top vertex portion 31e of the W-shaped brace 31 has an abutment element 32 welded thereto which may conveniently comprise a short piece of tubing. The overall height of the vertex portion 31e of brace 31 is selected so as to be greater than the height of flange 20a above the ground and hence permits the abutment 32 to engage the flange 20a at the bottom of the tractor transmission housing 20 when the main frame 30 is positioned relative to the tractor in a manner indicated in Figure 1.

A suitable force transmitting connection is provided from each end of bight portion 30a of main frame 30 to the tractor hitch links 13. Such force transmitting connection may conveniently comprise a pair of links 33 which have their one ends respectively welded to sleeves 34 which are journaled on the outer ends of bight portion 30a. Suitable welding spots 30f are provided on bight portion 30a to limit the inward axial displacement of the sleeves 34. At their outer ends, the links 33 are each pivotally connected to a secondary link 35, as by a pin 35a. Pin 35a engages secondary link 35 at a point much closer to one end of link 35 than the other end. Each link 35 is provided with end apertures 35b and 35c to selectively receive the hitch pin 18a conventionally provided on the ends of the tractor drawbar 18. The secondary link 35 thus permits a substantial variation in the over-all length of the force transmitting connection between the jack frame 30 and tractor hitch links 13. A spring clip 36 may be provided to detachably secure the secondary link 35 to primary link 33 in either of its two positions of extension relative to the primary link 33.

In operation, the aforedescribed jack may be employed to selectively effect the elevation of either the front wheels of the tractor 10 or the rear wheels. In Figure 1, the jack is shown in position relative to the tractor for elevating the front wheels. In such position, the main jack frame 30 is positioned beneath the tractor with the bight portion 30 disposed forwardly of the tractor center of gravity CG and with the abutment element 32 in engagement with the flange 20a at the bottom of the tractor transmission housing 20. Secondary links 35 are swung to their fully extended position with respect to the primary links 33 and are effectively connected to the tractor hitch links by slipping the drawbar pins 18a through the end holes 35c. Upon elevation of the tractor hitch links 13, through actuation of the tractor hydraulic mechanism, the main jack frame 30 will be rocked relative to the tractor and the front wheels of the tractor will be lifted as illustrated in Figure 1. It should be noted that in this position, the vertical arm portions 30b and 30c of the main frame 30 extend along each side of the tractor transmission housing 20 and thus provide positive stops against any lateral sway or displacement of the tractor while elevated.

To elevate the rear wheels of the tractor, the main frame 30 of the jack is shifted rearwardly relative to the tractor so that the arcuate straps 30d and 30e of the main frame engage the tractor rear axle housing 12. In this position, the secondary links 35 are swung to their shortest position with respect to the primary links 33 and are connected to the tractor drawbar pins 18a by the end hole 35b. Elevation of the tractor hitch links 13 will then produce elevation of the tractor rear wheels until the abutment element 32 of the main frame 30 moves into engagement with the underside of the differential housing 17. Thus, additional support and bracing of the tractor in its elevated position are provided by the abutment element 32.

It should be noted that the inclined disposition of the arms 30b and 30c coupled with the W-shaped configuration of the brace element 32 provides a triangular bracing configuration for each element of the tractor jack which is subjected to the tractor weight, and thus provides utmost rigidity with a very economically manufacturable construction.

It will, of course, be understood that various details of construction may be varied through a wide range without departing from the principles of this invention and it is, therefore, not the purpose to limit the patent granted hereon otherwise than necessitated by the scope of the appended claim.

We claim:

A tractor jack for selectively lifting the front or rear wheels of a tractor of the type having laterally spaced, power-lifted, trailing hitch links, comprising a U-shaped main frame having two spaced elongated arms and a ground-engaging bight portion, means on the ends of said arm portions adapted for respectively engaging laterally spaced points on the tractor rear axle housing in one longitudinal position of said main frame relative to the tractor, a W-shaped integral brace symmetrically mounted on said U-shaped main frame and having its bottom vertices rigidly secured to said bight portion and its free end portions respectively rigidly secured to medial portions of said arms, the upper vertex portion of said W-shaped brace being proportioned to engage the tractor body at a point substantially forwardly of said rear axle housing when said main frame is placed in a second longitudinal position relative to the tractor, a pair of link elements respectively pivotally connected at one end to the lateral extremities of said bight portion, and means for respectively connecting said link elements to the tractor hitch links in either of said longitudinal positions of said main frame relative to the tractor.

ANDREW BLAAUW.
GEORGE W. FINDLEY.

No references cited.